US011122047B2

(12) United States Patent
Brand

(10) Patent No.: US 11,122,047 B2
(45) Date of Patent: Sep. 14, 2021

(54) INVITATION LINKS WITH ENHANCED PROTECTION

(71) Applicant: CTERA Networks, Ltd., Petach-Tikva (IL)

(72) Inventor: Aron Brand, Petach-Tikva (IL)

(73) Assignee: CTERA Networks, Ltd., Petach-Tikva (IL)

( * ) Notice: Subject to any disclaimer, the term of this patent is extended or adjusted under 35 U.S.C. 154(b) by 611 days.

(21) Appl. No.: 14/674,225

(22) Filed: Mar. 31, 2015

(65) Prior Publication Data

US 2015/0288701 A1 Oct. 8, 2015

Related U.S. Application Data

(60) Provisional application No. 61/974,123, filed on Apr. 2, 2014.

(51) Int. Cl.

| | |
|---|---|
| ***G06F 7/04*** | (2006.01) |
| ***G06F 15/16*** | (2006.01) |
| ***H04L 29/06*** | (2006.01) |
| ***G06F 21/42*** | (2013.01) |
| ***G06F 21/33*** | (2013.01) |
| ***H04L 29/08*** | (2006.01) |

(52) U.S. Cl.

CPC ............ *H04L 63/102* (2013.01); *G06F 21/33* (2013.01); *G06F 21/42* (2013.01); *H04L 63/08* (2013.01); *H04L 63/0838* (2013.01); *H04L 67/1097* (2013.01); *H04L 63/108* (2013.01); *H04L 63/18* (2013.01)

(58) Field of Classification Search

None

See application file for complete search history.

(56) References Cited

U.S. PATENT DOCUMENTS

| | | | | |
|---|---|---|---|---|
| 8,434,133 | B2 * | 4/2013 | Kulkarni | G06F 21/33 726/4 |
| 8,504,814 | B2 * | 8/2013 | Murray | H04L 63/123 713/2 |
| 8,566,462 | B2 * | 10/2013 | Jun | G06F 17/30864 709/203 |
| 9,768,969 | B2 * | 9/2017 | Weinstein | H04L 12/185 |
| 2007/0112913 | A1 * | 5/2007 | Bales | G06Q 10/10 709/204 |

(Continued)

*Primary Examiner* — Jeffrey Nickerson
*Assistant Examiner* — Vadim Savenkov
(74) *Attorney, Agent, or Firm* — M&B IP Analysts, LLC

(57) ABSTRACT

A method and system for providing invitation links with enhanced protection are presented. The method includes sending, to at least one invitee, at least one invitation link for accessing the protected resource, wherein the at least one invitation link includes a secret invitation code encoded therein, wherein the secret invitation code is unique to each invitee, the invitation link is sent to the at least one invitee through a primary communication channel; upon detecting an attempt to access the at least one invitation link, determining whether the encoded secret invitation code matches a known secret invitation code; upon determining that the secret invitation code matches the known secret invitation code, performing a verification process to authenticate the invitee via a secondary channel of communication; and upon determining that the verification process has been passed, granting access to the protected resource.

24 Claims, 12 Drawing Sheets

100

Start

S110 Receive a request to provide one or more invitation links containing a secret invitation code to a protected resource S120 Set a protection layer for the invitation S130 Store the secret invitation codes and a protected resource identifier in a database S140 Send at least one invitation link to each recipient S150 Determine an attempt to access the protected resource through an invitation link S160 Execute a verification process S170 Upon verification grant access to protected resource End

(56) References Cited

U.S. PATENT DOCUMENTS

2010/0071072 A1* 3/2010 Holland ................. G06Q 10/08 726/27
2010/0211637 A1* 8/2010 Borzsei .................. G06Q 50/01 709/204
2011/0035503 A1* 2/2011 Zaid .................... H04L 63/0407 709/228
2013/0067594 A1* 3/2013 Kantor ................ G06F 21/6218 726/28
2014/0095871 A1* 4/2014 Hoard ................. H04L 63/0428 713/168
2015/0281460 A1* 10/2015 Chandak ................. H04M 3/56 379/202.01
2016/0044043 A1* 2/2016 Bouvet ................... G06F 21/10 726/1

* cited by examiner

400A

Invitaiton to view my folder "bla"

John Smith has invited you to {view|collaborate on} a shared folder called "bla".

{user optional message}

View the shared folder "bla"

401

Figure 5C:
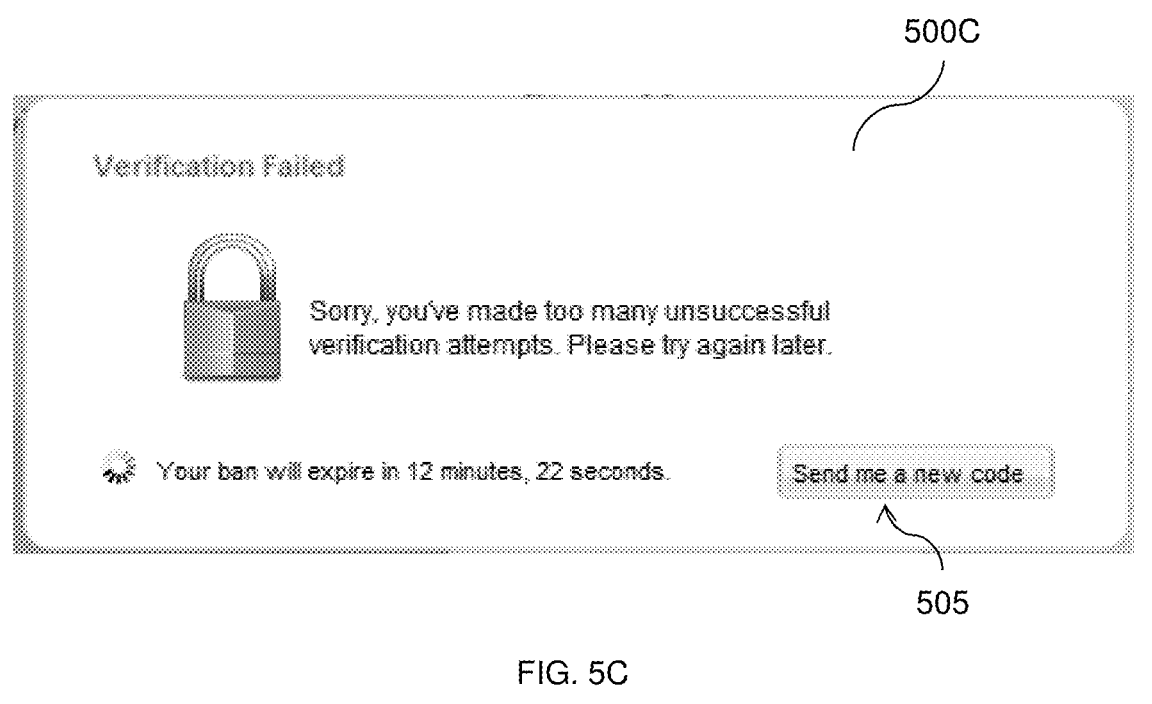

500C

Verification Failed

Sorry, you've made too many unsuccessful verification attempts. Please try again later.

Your ban will expire in 12 minutes, 22 seconds.

Send me a new code

Collaboration Policy

Add Rule | Move Down | Move Up | Remove Rule

| From | To Email | Authentication | Permission Level | Action |
| --- | --- | --- | --- | --- |
| Team Members | *aexp.com | SMS | ANY | Allow |
| Group 01 | *gmail.com | Email | Read | Deny |
| Team Members | *aol.com | ANY | Write | Allow |
| Group 01 | *fbi.gov | None | Read/Write | Deny |
| Team Members | * | ANY | ANY | Deny |

INVITATION LINKS WITH ENHANCED PROTECTION

CROSS-REFERENCE TO RELATED APPLICATIONS

This application claims the benefit of U.S. Provisional Application No. 61/974,123 filed on Apr. 2, 2014, the contents of which are hereby incorporated by reference.

TECHNICAL FIELD

The present disclosure relates generally to systems and methods for providing links to content, and more specifically to providing links to content featuring enhanced security.

BACKGROUND

In file-based collaboration systems, it is common to allow sharing of files via "invitation links" which incorporate some secret code incorporated in, e.g., a URL, thereby granting access to some file or folder. Such systems may allow one user to send a link to another user over e-mail, social network websites, or any other communication medium, wherein the other user may view or modify the contents of such file or folder by clicking on the link.

Any disclosure or compromise of a secret code allows an attacker to gain access to the target file or folder. For example, an attacker may gain access to the target file or folder by stealing a browser history list, receiving a URL inadvertently in place of the intended recipient, or being forwarded the URL from the intended recipient. Furthermore, it is difficult or impossible to distinguish such malicious use of the invitation from legitimate use by the intended recipient.

As a result, it is often desirable to provide further protection for these links, such as by providing multiple authentication factors ("multifactor authentication") in addition to the secret code embedded in a URL. Such factors may include, for example, verifying that the recipient possesses access to a specific device, verifying that the recipient can access a specific email mailbox, and so on. Existing systems that provide multifactor authentication require the recipient to either register a user account in the system or previously own such an account. This is not always a desirable requirement for "ad-hoc" collaboration. It is often desirable to invite external users to a corporate system in which they do not have an account. Furthermore, it may be prohibitive or otherwise inconvenient for the recipient to go through the complex process of registering a new user account, dealing with the overhead of remembering another password, and so on.

It would therefore be advantageous to provide a solution that would overcome the deficiencies of the prior art by providing multifactor authentication that does not require possession of a user account to access. It would be further advantageous to provide a solution that can permit access to a protected resource only to a select number of accessing devices.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all embodiments. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a method for providing invitation links with enhanced protection. The method comprises sending, to at least one invitee, at least one invitation link for accessing the protected resource, wherein the at least one invitation link includes a secret invitation code encoded therein, wherein the secret invitation code is unique to each invitee, the invitation link is sent to the at least one invitee through a primary communication channel; upon detecting an attempt to access the at least one invitation link, determining whether the encoded secret invitation code matches a known secret invitation code; upon determining that the secret invitation code matches the known secret invitation code, performing a verification process to authenticate the invitee via a secondary channel of communication; and upon determining that the verification process has been passed, granting access to the protected resource.

The disclosed embodiments also include a system for providing invitation links with enhanced protection. The system comprises a processing unit; and a memory, the memory containing instructions that, when executed by the processing unit, configure the system to: send, to at least one invitee, at least one invitation link for accessing a protected resource, wherein the at least one invitation link includes a secret invitation code encoded therein, wherein the secret invitation code is unique to each invitee, the invitation link is sent to the at least one invitee through a primary communication channel; upon detecting an attempt to access the at least one invitation link, determine whether the encoded secret invitation code matches a known secret invitation code; upon determining that the secret invitation code matches the known secret invitation code, perform a verification process to authenticate the invitee via a secondary channel of communication; and upon determining that the verification process has been passed, grant access to the protected resource.

The disclosed embodiments also include a method for generating invitation links with enhanced protection. The method comprises determining a protected resource to which the invitation link will provide access, wherein the protected resource is identified by a protected resource identifier; generating a secret invitation code being unique for each invitee; encoding the secret invitation code and the protected resource identifier in the invitation link; and storing the generated secret invitation code and the invitation link.

The disclosed embodiments also include a system for generating invitation links with enhanced protection. The system comprises a processing unit; and a memory, the memory containing instructions that, when executed by the processing unit, configure the system to: determine a protected resource to which the invitation link will provide access, wherein the protected resource is identified by a protected resource identifier; generate a secret invitation code being unique for each invitee; encode the secret invitation code and the protected resource identifier in the invitation link; store the generated secret invitation code and the invitation link.

The disclosed embodiments also include a method for a secured registration process. The method comprises sending, to at least one invitee, at least one invitation link for registering for a service, wherein the at least one invitation link includes a secret invitation code encoded therein, wherein the secret invitation code is unique to each invitee, the at least one invitation link is sent to the at least one invitee through a primary communication channel; upon detecting an attempt to access the at least one invitation link, determining whether the encoded secret invitation code matches a known secret invitation code; upon determining that the known secret invitation code is found, displaying a registration process; and performing a verification process to authenticate the invitee via a secondary channel of communication.

The disclosed embodiments also include a system for a secured registration process. The system comprises a processing unit; and a memory, the memory containing instructions that, when executed by the processing unit, configure the system to: send, to at least one invitee, at least one invitation link for registering for a service, wherein the at least one invitation link includes a secret invitation code encoded therein, wherein the secret invitation code is unique to each invitee, the at least one invitation link is sent to the at least one invitee through a primary communication channel; upon detecting an attempt to access the at least one invitation link, determine whether the encoded secret invitation code matches a known secret invitation code; upon determining that the known secret invitation code is found, display a registration process; and perform a verification process to authenticate the invitee via a secondary channel of communication.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 5A-5C are exemplary screenshots of verification challenge messages according to an embodiment;

FIG. 9 is an exemplary screenshot illustrating a collaboration policy according to an embodiment.

DETAILED DESCRIPTION

Figure 1:
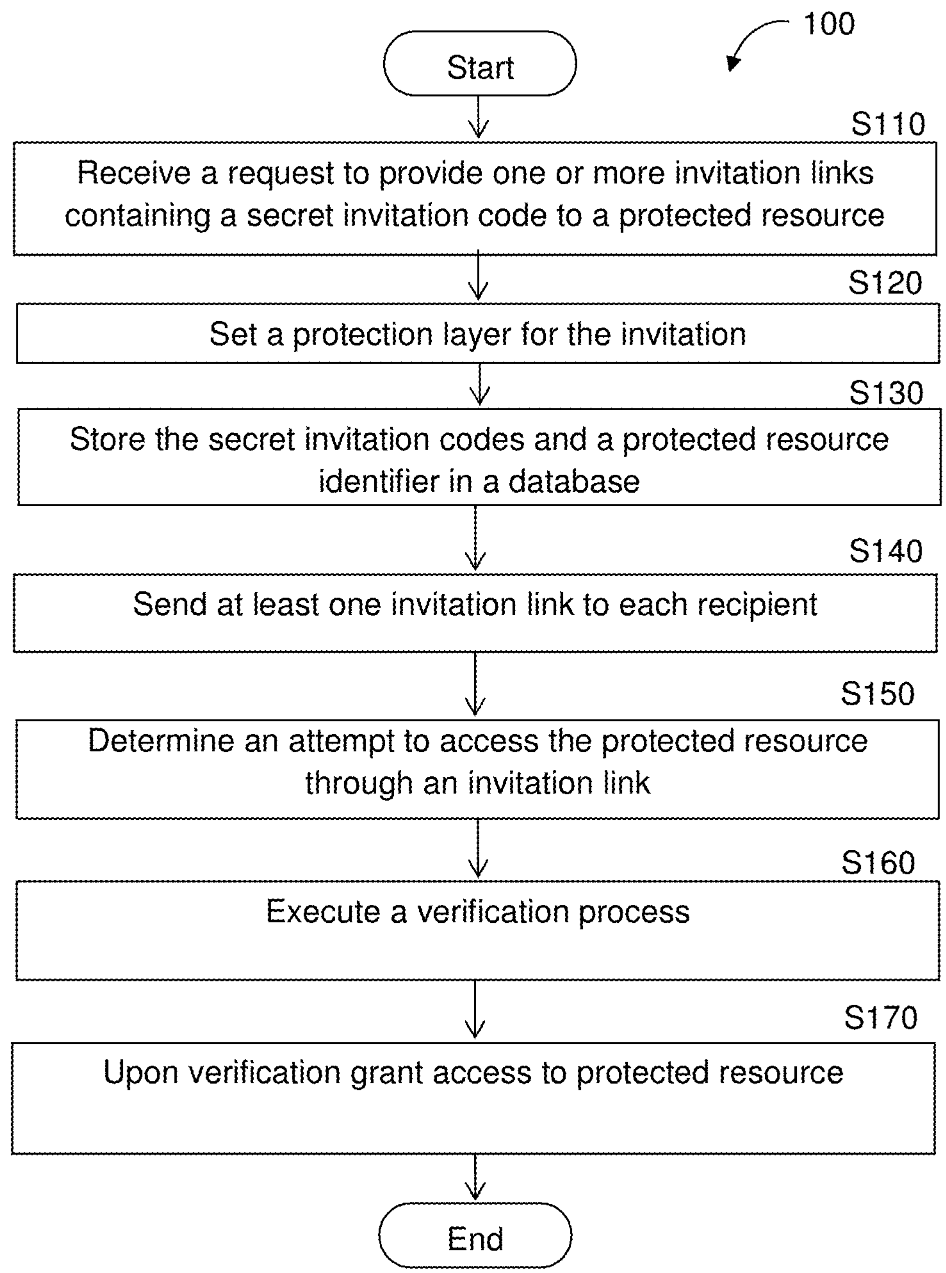
FIG. 1 is a flowchart illustrating a method for providing an invitation link according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for providing invitation links for ad-hoc file collaboration with enhanced protection. In one exemplary embodiment, the method includes creating an invitation link containing a secret invitation code, storing at least the secret invitation code and a protected resource identifier of a protected resource, sending a message containing the invitation link, verifying the secret invitation code upon opening of the invitation link, sending a verification challenge using a secondary channel of communication, waiting for recipient to supply an answer to the challenge, verifying that the answer is correct, and granting access to the protected resource.

FIG. 1 shows an exemplary and non-limiting flowchart 100 illustrating a method for providing an invitation link with enhanced protection according to an embodiment. In S110, a request to provide one or more invitation links to a protected resource and the one or more invitation links are received. A protected resource may be a folder or a file stored, for example, in a hybrid cloud storage system. A protected resource is identified by a unique identifier. Each invitation link contains a secret invitation code that may be unique to each recipient designated by the requestor.

An invitation link may be, e.g., a uniform resource locator (URL). When a link is sent to multiple recipients (invitees), each recipient will receive a different invitation code. As a non-limiting example, an invitation link may be: https://some.web.site/invitations/aaaaaa-bbbbbb.

In this example, the string "aaaaaa-bbbbbb" is the secret invitation code. In an exemplary and non-limiting implementation, that code is generated as a concatenation of two large random strings: "aaaaaaa," a 20 hexadecimal digit random code that is unique to each invitation, identifies the invitation, and is shared among multiple invitees, and "bbbbbb," a 20 hexadecimal digit random code that is private and unique to each specific invitee. It should be appreciated that the string is not limited to a hexadecimal number have a predefined length.

Specifically, according to various exemplary embodiments, the secret invitation code may be generated by, e.g., a random number, letter, and/or symbol generator that generates a pre-designated string of random numbers, letters, and/or symbols (e.g., 6 random numbers, letters, and/or symbols).

In S120, a protection layer is configured and set for the invitation to allow secured access to the protected resources. This protection layer may include, but is not limited to, authentication and/or verification through a secondary channel, generation of a verification challenge, a timer, a maximum number of access tries, an authentication session, and the like. The session, timer, and number of attempts are designed to prevent access to the protected entity by robots (e.g., attack tools), malicious users, or unauthorized users. The protection layer added to the invitation may be configured through a user interface. In an embodiment, a sharing security policy module controls which sharing methods are available. This control may depend on factors such as, but not limited to, the path in the storage system, the target email, the classification of the shared files, and so on. In addition, the sharing security policy module may consult with an external security module for data leakage protection (DLP) via an application programming interface (API) such as, for example, a representational state transfer (REST) API.

According to certain embodiments, a verification challenge is generated, the verification challenge is sent to a recipient (invitee) of the invitation link through the secondary channel associated with the recipient when the recipient attempts to access the protected resource. This verification challenge process is discussed in greater detail herein below with respect to FIG. 2. The verification challenge may be, for example, a hard to guess string of numbers, letters, and/or symbols, which need to be typed by the recipient as a condition for gaining access to the protected resources. In another example, the verification challenge may be a link containing a hard to guess string of numbers, letters, and/or symbols, which needs to be clicked by the recipient as a condition for gaining access.

In S130, each secret invitation code of the one or more invitation links and protected resource identifiers (IDs) associated with the linked protected resources are stored in a non-transient storage.

In S140, each recipient is sent one or more invitation links. In an embodiment, the invitation link contains the respective secret invitation code encoded therein. As noted above the secret code is unique for each invitee. Once the invitation links are sent out, authorized and authenticated invitees may subsequently utilize the links to attempt to access the protected resources.

In S150, an attempt to access the protected resource through an invitation link is determined. In S160, in response to the attempt to access the protected resource, a verification process of the device attempting to access the resource takes place. An exemplary and non-limiting verification process is described further herein below with respect to FIG. 2. As will be discussed in more detail herein below with respect to FIG. 2, in an embodiment, this process may include verification via a secondary channel defined in the protection layer. To this end, when a user attempts to access the protected link a verification challenge is sent to the user.

In an embodiment, the verification challenge may be a hard to guess string of numbers, letters, and/or symbols, sent to the user via the secondary channel of communication. The user is required to respond to the challenge within one or more of the restrictions (e.g., a current session, a predefined amount of time, and/or number of attempts) set as part of the protection layer. The secondary channel of communication may include, is but not limited to, an email, a short message service (SMS), an instant messaging, an authenticator application, a token, and so on. It should be noted that the verification challenge is sent to the recipient of the invitation link. As a result, failure by the recipient to pass the verification challenge would result in blocking any access to the protected resource.

In another embodiment, the verification challenge may be realized as a temporary (hypertext) link, containing a hard to guess string of numbers, letters, and/or symbols, which may be sent instead of a hard to guess string of numbers, letters, and/or symbols. In that embodiment, when the temporary link is clicked, a browser window containing the shared folder or file is opened and the link is valid for only a short period of times, and when used, immediately ceases to be valid. As a result, such a temporary link would only be accessible once.

In S170, upon successful verification, access to the protected resource is granted. Access to the protected resource may be granted via, for example, peer-to-peer sharing and/or file server sharing.

In some embodiments, the accessing user device may be required to undergo pre-admission security configuration checks as a condition for being granted access to the protected resource. For example, an ActiveX control or Java Applet can be downloaded to the accessing device. Such ActiveX control or Java Applet ensures, for example, that the system is running an up-to-date antivirus and firewall before access to the protected resource is granted.

Figure 2:
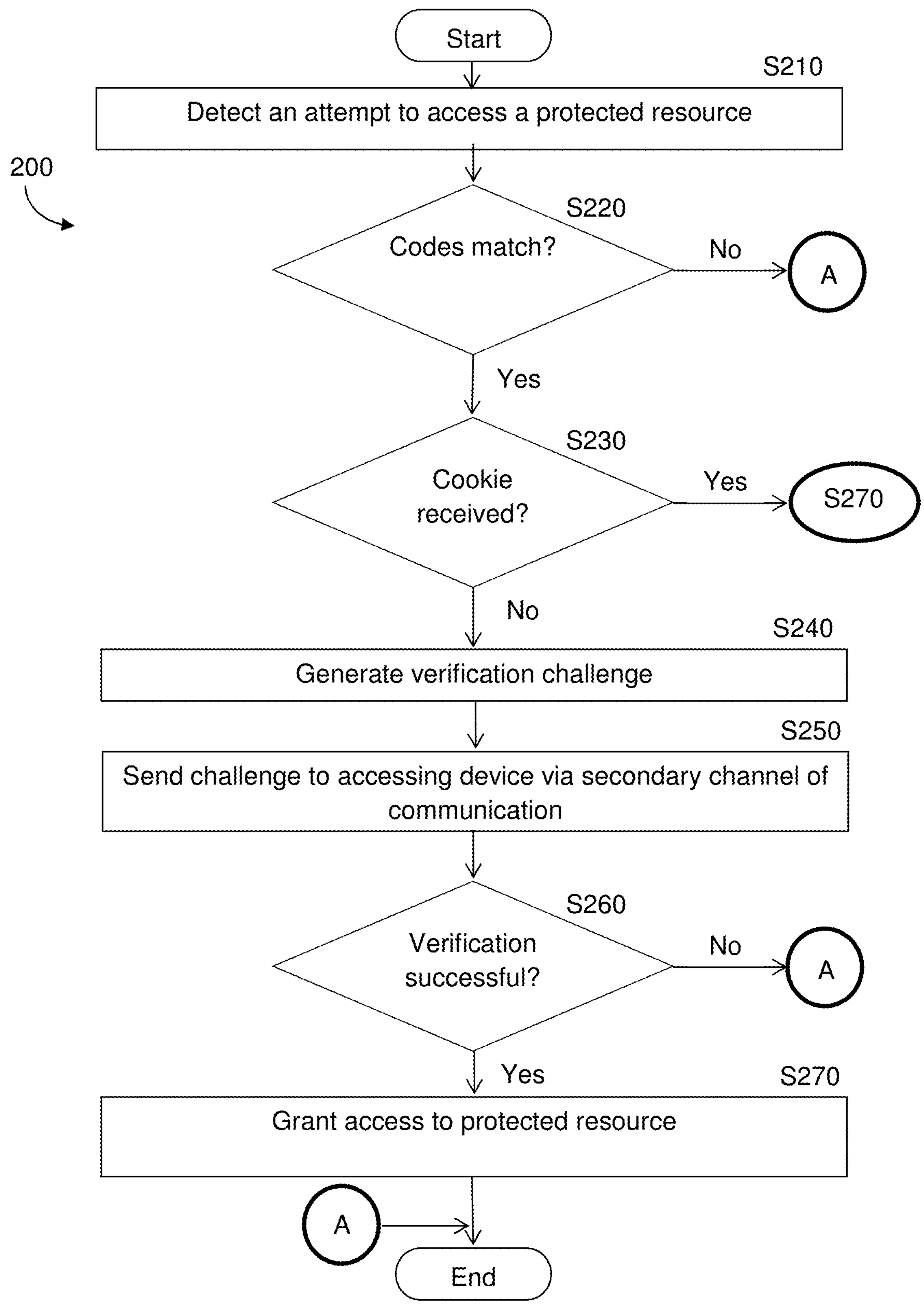
FIG. 2 is a flowchart illustrating a method for verification of an identification code and a device status according to an embodiment.

FIG. 2 is an exemplary and non-limiting flowchart 200 illustrating the verification process according to an embodiment. In S210, an attempt to access a protected resource through an invitation link is detected. A recipient may attempt to access the protected resource via a user device which may be, but is not limited to, a personal computer, a laptop computer, a tablet computer, a smart phone, and so on.

In S220, a secret invitation code encoded in the link is matched to the codes previously generated and stored (FIG. 1, S130), to determine if the invitation code matches a known invitation. In an embodiment, a match occurs when every number, letter, and/or symbol in a provided invitation code as well as the order of those numbers, letters, and/or symbols is identical to the numbers, letters, symbols, and order of a stored invitation code. If a match occurs, execution proceeds with S230; otherwise, execution terminates. Optionally, in S230, another check is made to determine if a valid, persistent security cookie has been received. The cookie signifies that the device responding to the link is a trusted device. If such a cookie has been received, access is granted to the protected resource without requiring verification through a secondary channel of communications; otherwise, execution continues in S240. In an embodiment, the security cookies are saved in a database communicatively connected to the device or system performing the verification.

In S240, verification through a secondary channel is performed by generating a verification challenge. As noted above, the verification challenge may be, but is not limited to, a random number, a temporary link, a voice prompt, a token, and the like. As further noted above, the challenge may be associated or otherwise set with one or more restrictions. Such restrictions may include, but are not limited to, a timer, a number of maximum allowed attempts, a current session, and so on.

In S250, a verification challenge message containing the generated verification challenge is sent to the accessing user device via the secondary channel. In S260, it is checked if the user has correctly responded to the challenge within one or more of the defined restrictions. As a non-limiting example, a prompt for a number is sent to the user as a challenge via a SMS. To access the protected resource, the user needs to enter the correct number within a short time period (e.g., 2 minutes); otherwise, the access is blocked. If the user passed the verification challenge, execution continues with S270; otherwise, execution terminates.

It should be noted that the challenge is not presented on the web browser, but rather through a secondary communications channel. Thus, if the link is initially mailed to a user-A and then forwarded to a user-B, the verification challenge is sent to the secondary channel associated with user-A. Secondary channels of communication may be, for example, email, short message service (SMS), authenticator applications, tokens, and combinations thereof. Therefore, user-B will not receive the challenge and, thus, will not be able to access the protected resource. Verification challenges are discussed further herein below with respect to FIGS. 4 and 5.

In S270, the user of the accessing device (i.e., the recipient) is granted access to the protected resource. In an exemplary embodiment, the recipient accessing the invitation from the accessing device can request that his or her device be identified as trusted. A trusted device will only require a verification challenge once per designated period of time (as a non-limiting example, the designated period of time may be 30 days) rather than requiring verification for every attempt to access during the designated period of time. In one embodiment, a persistent cookie is stored in the accessing device which allows the accessing device to be readily identified in subsequent accesses. A system administrator can delete specific user devices from a list of known trusted devices.

Figure 3:
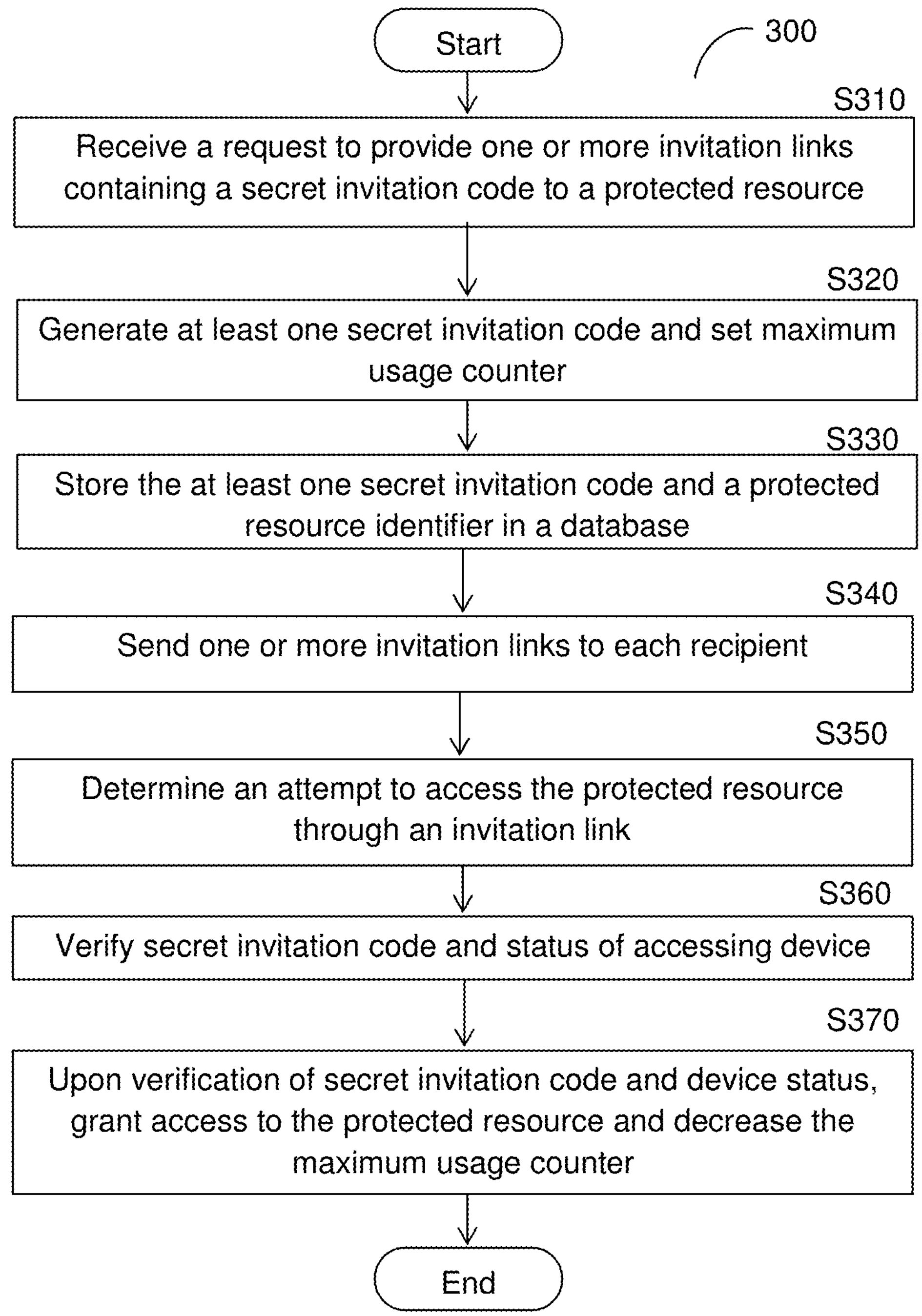
FIG. 3 is a flowchart illustrating a method for providing an invitation link that may only be opened on a limited number of computers and/or for a restricted time period according to an embodiment.

FIG. 3 is an exemplary and non-limiting flowchart illustrating a method 300 for providing an invitation link that may only be opened on a limited number of user devices and/or for a restricted time period according to an embodiment.

In S310, a request to provide one or more invitation links to a protected resource is received. Each of the one or more invitation links contains a secret invitation code that may be unique to each recipient designated by the requestor. An invitation link may be, e.g., a uniform resource locator (URL). The secret invitation code is encoded in the link. In an embodiment, the request may further include a list of recipients for the requested one or more invitation links.

In S320, at least one secret invitation code is generated and a maximum usage counter value is set. The process of generating a secret invitation code may be performed via, e.g., a random number, letter, and/or symbol generator that proceeds to generate a pre-designated amount of random numbers, letters, and/or symbols (e.g., 6 random numbers, letters, and/or symbols).

The maximum usage counter is an integer value representing the total number of new devices that may be granted access to the protected resource through the invitation link. The maximum usage counter may be set at, for example, a value determined based on user inputs, an administrator configured value, and so on. As a non-limiting example, if the maximum usage counter associated with an invitation link is set at 5, up to 5 different computers may be granted access to the protected resource through that invitation link. In S330, the at least one secret invitation code, along with a protected resource identifier associated with the protected resource, is stored in a non-transient storage.

In S340, each recipient is sent one or more invitation links, wherein each invitation link contains a secret invitation code of the at least one generated secret invitation codes. Once the invitation links are sent out, users may subsequently utilize the links to attempt to access the protected resource.

In S350, an attempt to access the protected resource through one of the sent invitation links is determined. The recipient utilizes an accessing device to attempt to access the protected resource. The accessing device may be, but is not limited to, a personal computer, a laptop computer, a tablet computer, a smart phone, and so on. In S360, in response to the attempt to access the protected resource, a verification process is executed. Verification is described in more detail herein above with respect to FIG. 2.

In S370, upon verification of the user and/or the status of the accessing device, access to the protected resource is granted and the maximum usage counter is decreased. Access to the protected resource may be granted via, for example, peer-to-peer sharing and/or file server sharing.

The maximum usage counter is decreased based on the number of devices that were granted access to the protected resource. As a typical example, if one device is granted access to the protected resource, the maximum usage counter is decreased by one. In an embodiment, a random persistent security cookie is planted in the accessing device, and the cookie is stored in a non-transient storage.

In some embodiments, the accessing device may be required to undergo pre-admission security configuration checks as a condition for being granted access to the protected resource. In a further embodiment, an ActiveX control or Java Applet can be downloaded to the accessing device. Such ActiveX control or Java Applet ensures, for example, that the system is running an up-to-date antivirus and firewall, before access to the protected resource is granted.

Figures 4A, 4B:
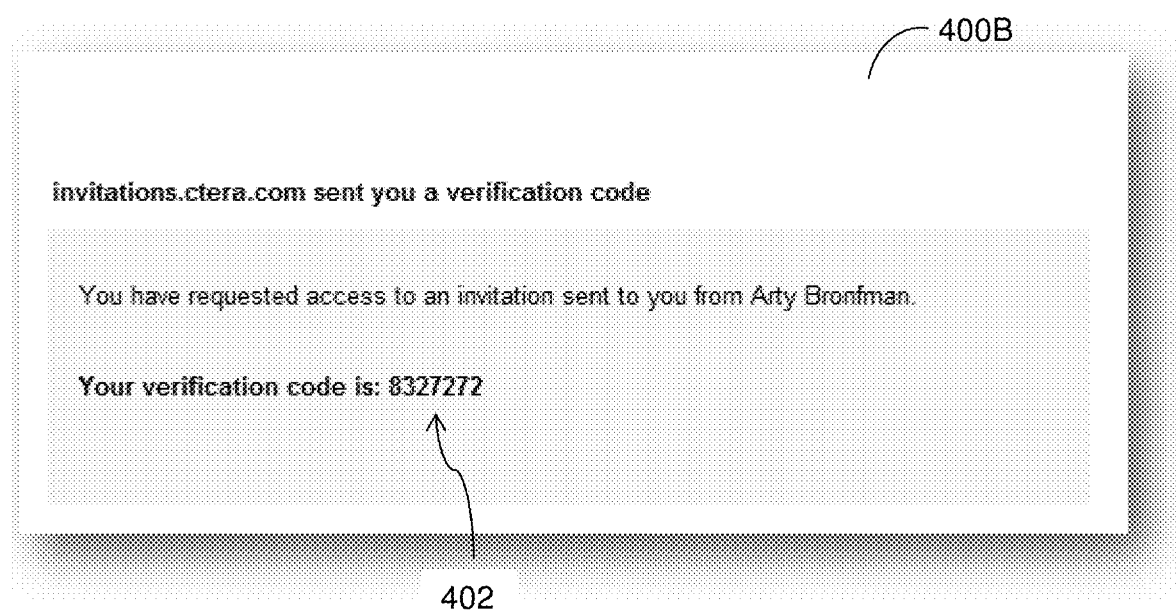
FIGS. 4A and 4B are exemplary screenshots of an invitation link and a verification challenge, respectively, according to an embodiment.

FIGS. 4A and 4B are exemplary and non-limiting screenshots 400A and 400B of portions of verification challenges generated according to an embodiment. In screenshot 400A, a message indicating the inviting user, "John Smith," and an invitation link 401 to the shared folder "bla" appear. In screenshot 400B, a verification code message containing a verification code 402 is displayed. Once the recipient receives the verification code 402, the recipient may attempt to pass a verification challenge. In an embodiment, a verification challenge message is sent to a recipient in response to the recipient attempting to access a protected resource through an invitation link as described further herein above with respect to FIG. 3.

Figure 5A:
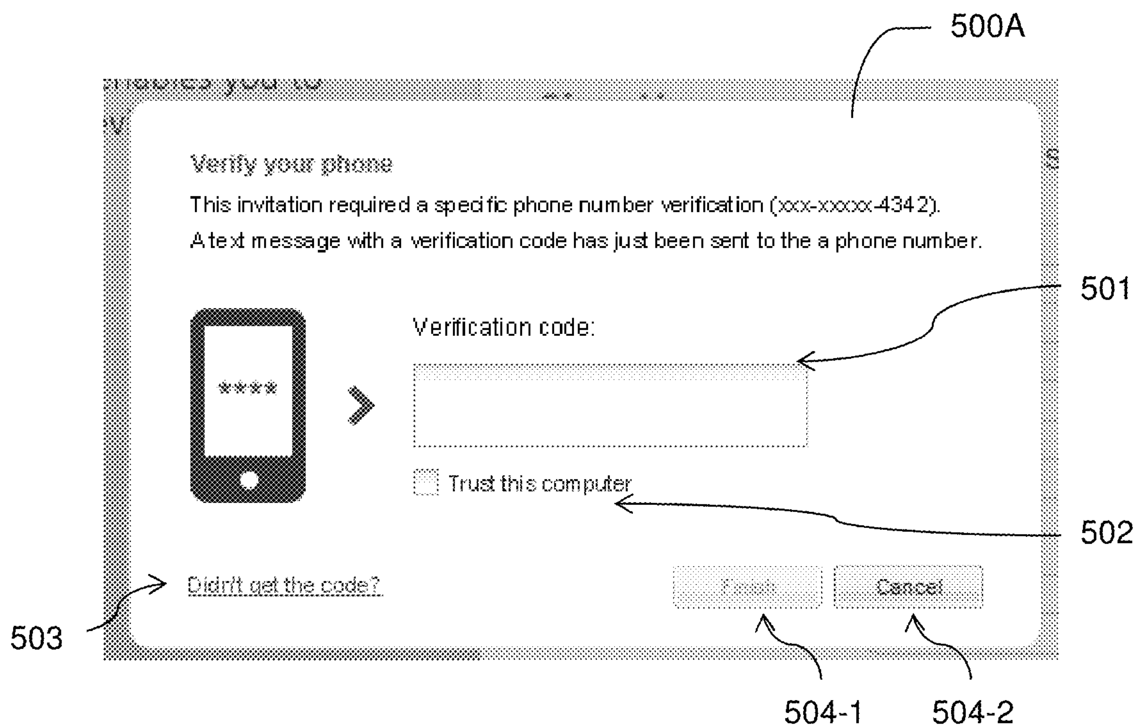
Figure 5B:
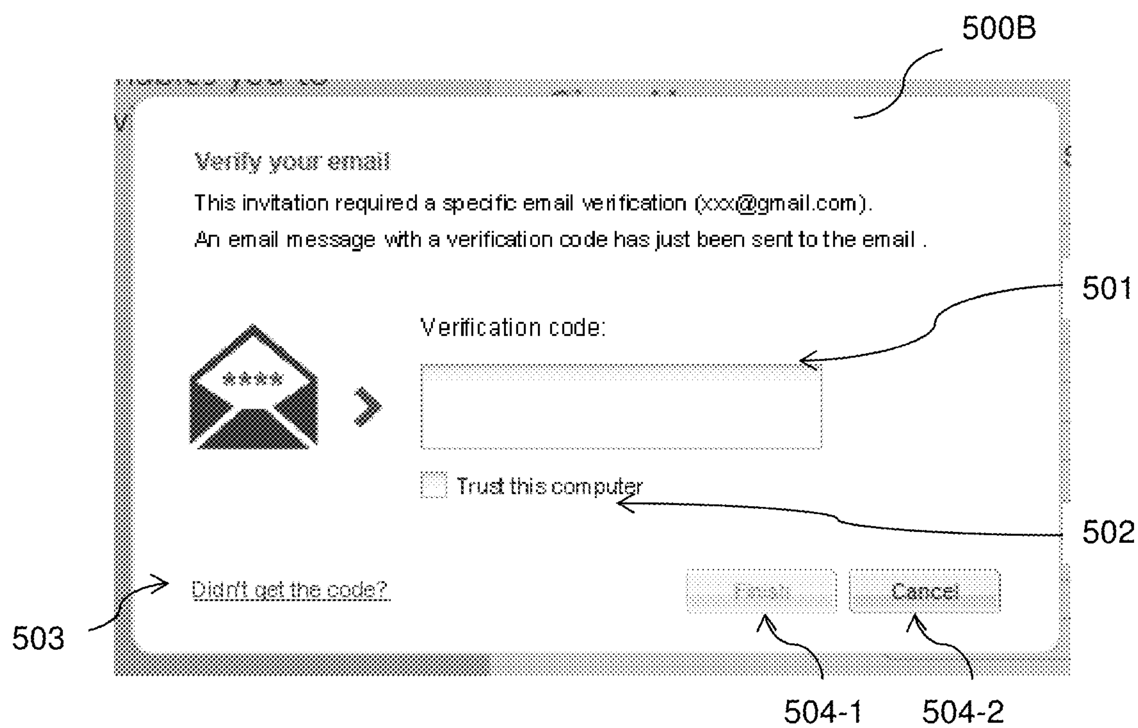

FIGS. 5A-5C are exemplary screenshots of verification challenge messages according to an embodiment. When verification over a secondary channel of communication is required, a verification challenge may be sent over the secondary channel of communication. As a non-limiting example, when a recipient attempts to access a protected resource via the recipient's personal computer, a verification challenge may be sent over. In a typical embodiment, the verification challenge is a long number, sequence of characters, or a combination thereof. Secondary channels of communication may be, for example, email, short message service (SMS), authenticator applications, tokens, and combinations thereof.

FIGS. 5A and 5B are exemplary and non-limiting screenshots 500A and 500B illustrating verification challenge messages utilized to provide the verification challenge sent via text message to a designated phone number and via email to a designated email address, respectively. Each message further contains an input portion 501, a check box 502 indicating an option to mark the computer as trusted, a help button 503, and action buttons 504. A user may enter the verification challenge (e.g., a number) into the input portion 501, and may further designate that the user wishes to mark the computer as trusted by checking the check box 502.

If the user failed to receive the verification code, the user may click on the help button 503 to, for example, have the verification code resent, to obtain troubleshooting instructions, and so on. The user may close out the verification challenge message window by clicking on one of the action buttons 504, such as a "Finish" button 504-1 and a "Cancel" button 504-2 seen in FIGS. 5A and 5B. In this embodiment, selecting "Finish" by clicking on the "Finish" button 504-1 will result in checking to see whether the verification code is correct by determining whether it matches a stored verification code, and selecting "Cancel" by clicking on the "Cancel" button 504-2 will simply close out the window without performing verification code matching.

In a typical embodiment, a user should be given a predefined number of tries to enter the code, after which the code is disabled (i.e., the code is forgotten by the server). As a non-limiting example, a user may be given five tries in which to enter the code correctly.

In a further typical embodiment, each IP address is not be able to generate more than a predefined number of verification challenge messages in a given time period (both the time period and number of verification challenge message parameters may be configurable). As an example, an IP address may be restricted to sending at most 5 verification messages per period of 15 minutes. If a correct verification is performed by a specific IP address, then this timer is reset. This may be useful in order to prevent denial of service (DoS) attacks on the portal, which force the portal to generate a high volume of messages to a malicious user. If a user exhausts all allowable verification messages in the given time period, a verification failure message such as that shown in screen 500C of FIG. 5C may be displayed on the accessing device. This message may further include, but is not limited to, a resend button 505 that allows a user to request that a new verification code be generated, stored, and sent.

FIGS. 6A-6D are exemplary and non-limiting screenshots illustrating a graphical user interface (GUI) utilized to set invitation links and additional protection layers according to an embodiment. A user initiating an invitation may define various parameters associated with the invitation. Such parameters may include, but are not limited to, challenge restrictions (e.g., an expiration date, a number of tries, a period of time allowed for each number of tries, etc.), a scope of coverage of storage (e.g., directories, sub-directories, files, etc.), access levels granted to files in defined storage locations (e.g., read only, write only, etc.), sharing options (e.g., public, single or private invitation, set of defined invitations, etc.), invitation information (e.g., a communication link for initial invitation transport communication channel for secondary verification, etc.), and trusted computer settings (e.g., permission to skip verification for trusted computers, defined duration of time for trusting a specific computer, etc.). A user may also modify, view, add, and/or delete invitation parameters.

Figure 6A:
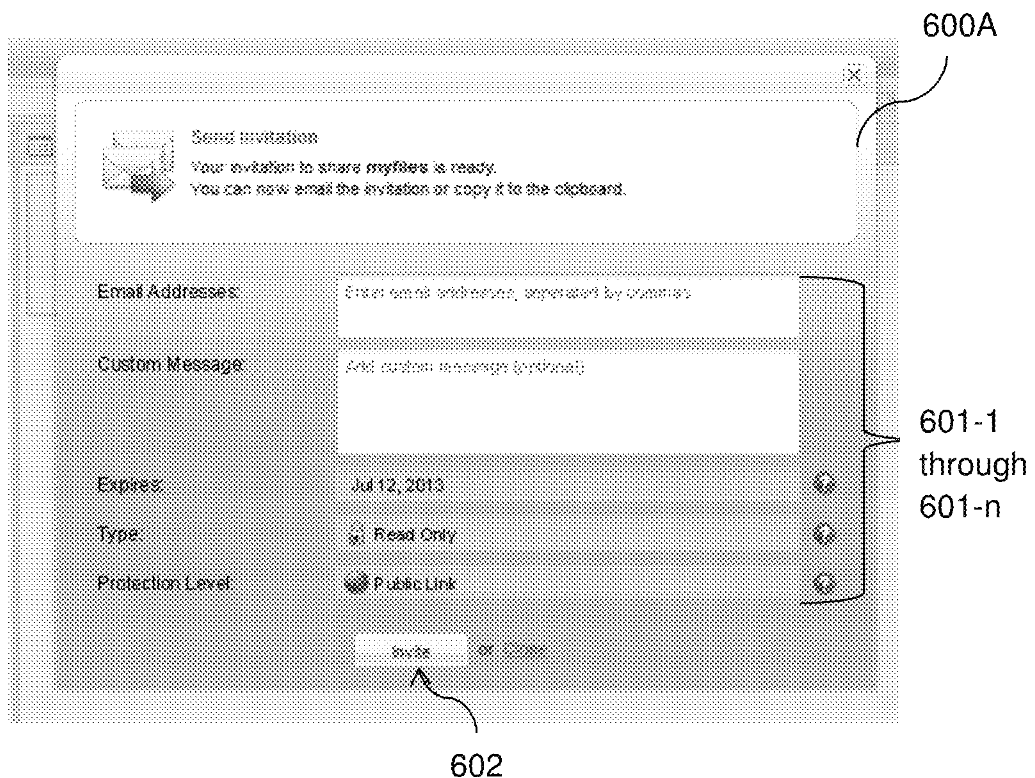
FIGS. 6A-6D are exemplary screenshots of graphical user interface screens according to an embodiment.
Figure 6B:
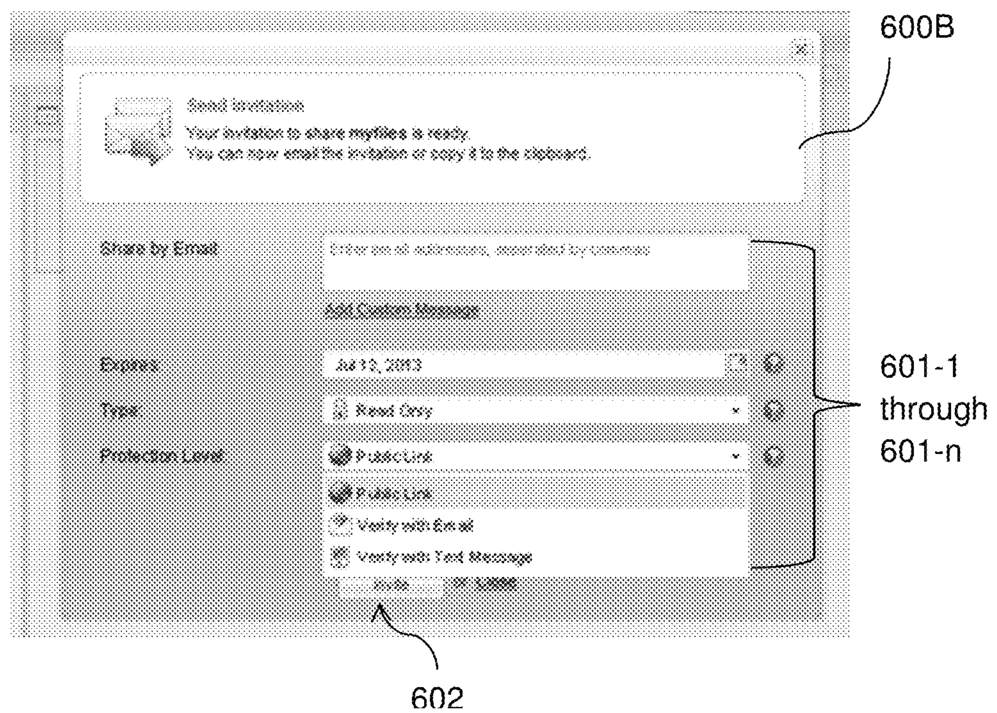
Figure 6C:
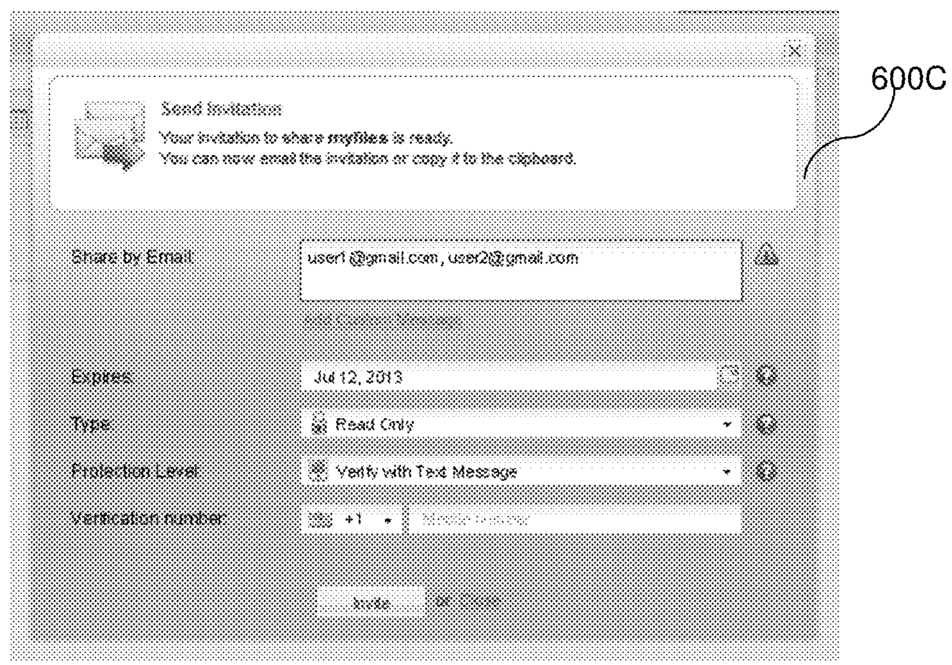

FIGS. 6A through 6C show exemplary and non-limiting screens 600A through 600C, respectively, of a GUI allowing a user to modify the invitation parameters of a particular invitation. Input boxes 601-1 through 601-*n* permit the user to edit the content of each box, thereby modifying the invitation parameters. The GUI further includes a confirmation button 602 (e.g., a button marked as "Invite"). The confirmation button 602 allows a user to confirm that he or she is done modifying the invitation parameters.

Figure 6D:
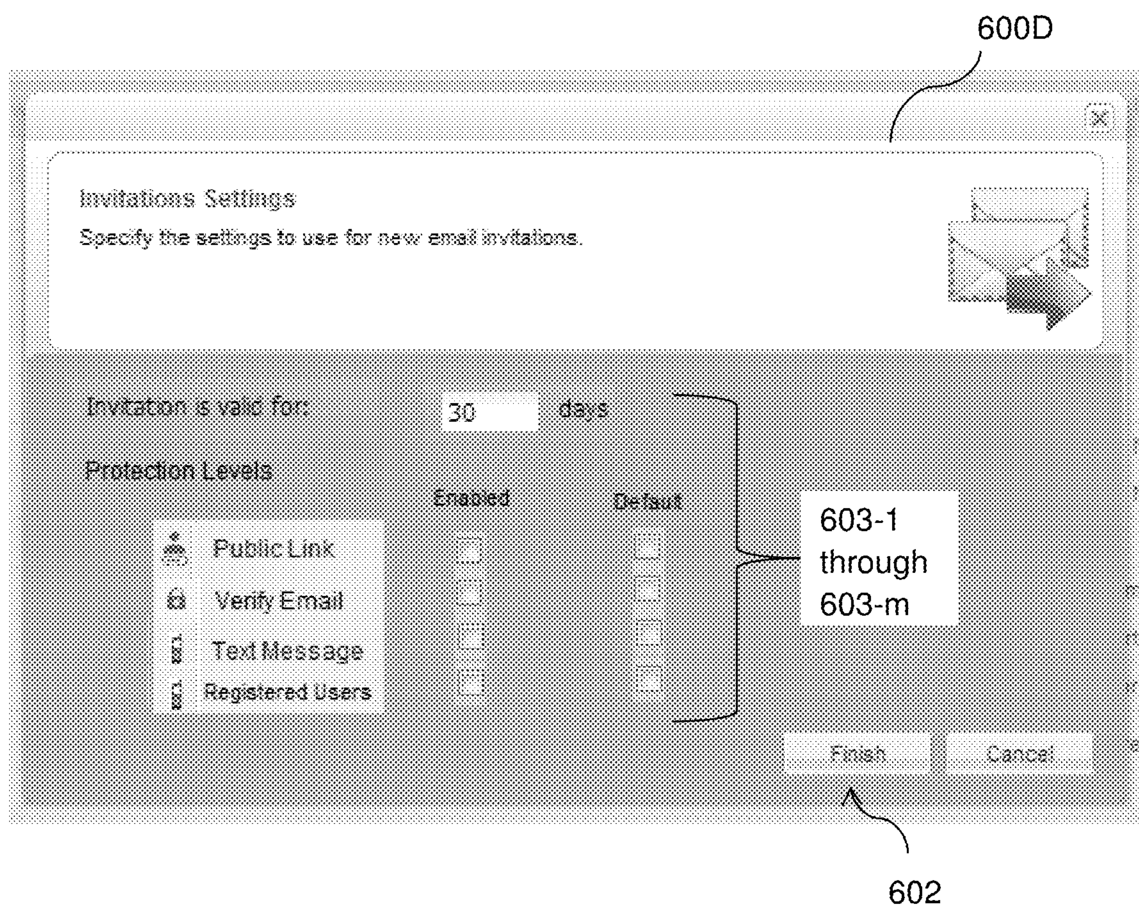

FIG. 6D shows an exemplary and non-limiting screen 600D of a GUI allowing a user to view and modify default invitation parameters for all invitations that are sent. The user may define which protection levels will be used by default via the input boxes 603-1 through 603-*m*, wherein the allowed protection levels are included in a security policy. In another embodiment, the security policy contains an additional granularity for controlling who can share what and with whom. As a non-limiting example, the granularity may control paths in the storage system, which users or groups can send invitations for files in a given path, specific file types or classification levels that the granularity is applied to, the destinations of target emails to which invitations are sent, actions (e.g., allow and deny), allowed protection levels, and so on.

Figure 7:
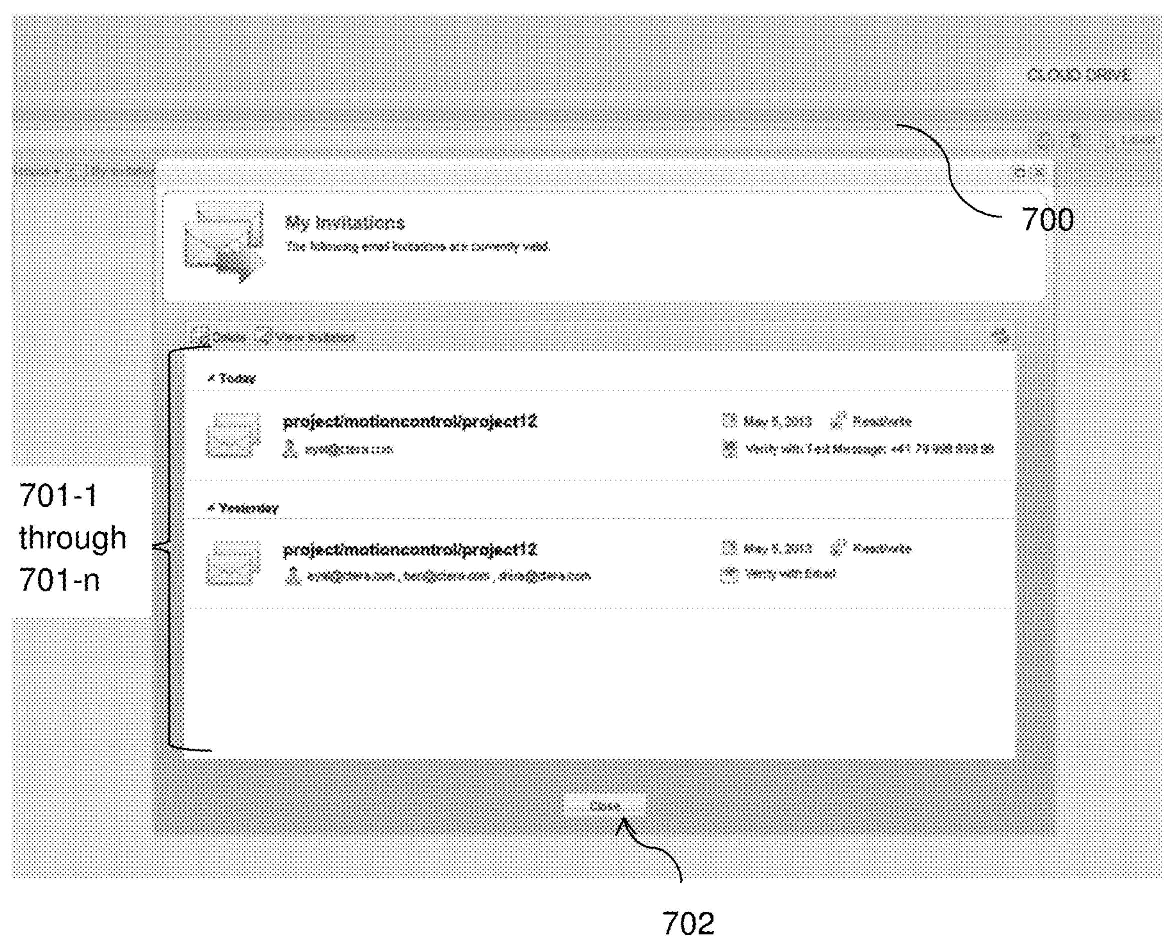
FIG. 7 is an exemplary screenshot of a graphical user interface allowing a user to view and modify existing invitations according to an embodiment.

FIG. 7 is an exemplary and non-limiting screenshot 700 of a GUI allowing a user to view and modify existing invitations according to an embodiment. The GUI may include rows illustrating each of the existing invitations that has been sent by the user, such as rows 701-1 through 701-*n* (hereinafter referred to individually as a row 701 and collectively as rows 701, merely for simplicity purposes). In an embodiment, when a user clicks a row 701, the GUI may display a dialog allowing the user to, e.g., delete the invitation, resend the invitation, see the public link (only if the invitation has a "public" protection level), edit the invitation details, and so on.

The various embodiments disclosed herein can be utilized for a secured registration process. The registration process is initiated by sending an invitation link containing a secret invitation code to an invitee. The invitation is for a registration form or webpage of a service, such as cloud storage service. Upon clicking the invitation link by the user, a secret invitation code matching a URL of the invitation link is looked up. If such a code is found, the registration form is displayed to the user. Thereafter, the user is prompted to fill in the missing information in the registration form. Once the required information is provided, a verification process is performed through a secondary channel of communication. The verification process is discussed above. Upon successful verification, a user account is created.

In another embodiment, invitations to access a protected resource are sent based on a collaboration policy. The collaboration policy is a whitelist/blacklist that defines external users (external to a predefined group of users) that can access the resources and the permissions and/or the verification method required for each external user or a group of users. The verification method may define if the verification code can be sent through an email, SMS, and so on. The permissions may include read/write, read only, and write only. In one embodiment, the collaboration policy further defines whether the recipient of an invitation link is able to re-share the content; enforcing DRM (digital rights management) measures. The DRM measures include, for example, restricting downloads and allowing only a preview, adding a personalized watermark to shared documents, restricting printing, disallowing synchronizing the content to specific devices, restricting uploads to the shared resource based on specific file types, and so on.

An exemplary screenshot 900 of a collaboration policy is provided in FIG. 9. In an embodiment, the collaboration policy is executed in a predefined order. The first rule to match is the decision. Invitation links are sent and verified based on the provisions defined in the policy. As example, line 902 in the policy shown in FIG. 9 mandates that users of the group "Group 01" are not allowed to send collaboration links to external users with a "gmail.com" email suffix, having read only permission, and with verification type "Email".

Figure 8:
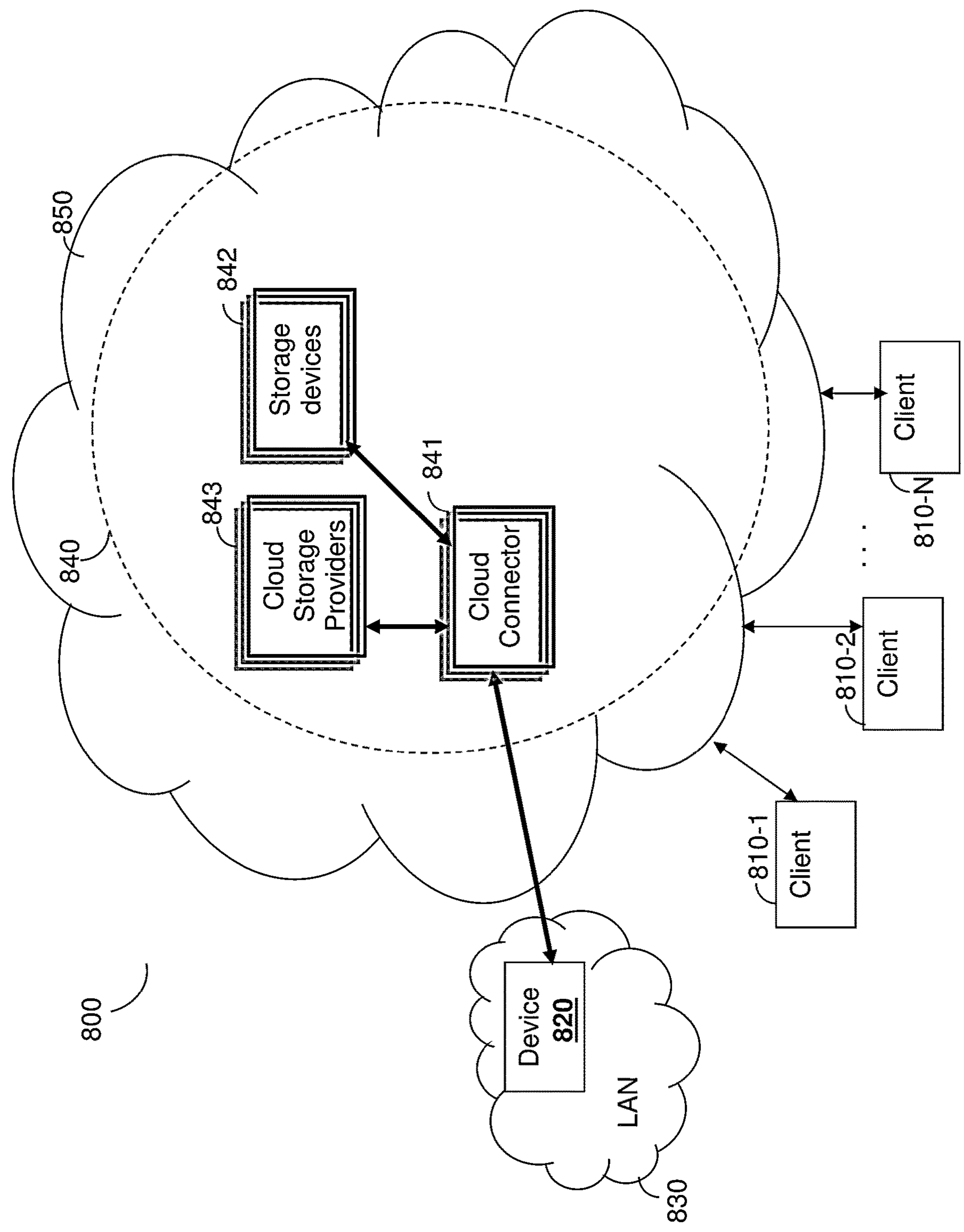
FIG. 8 is an exemplary and non-limiting schematic diagram of a system where the disclosed embodiments can be applicable.

FIG. 8 shows an exemplary and non-limiting schematic diagram of a system 800 in which the disclosed embodiments can be applicable. The system 800 includes a plurality of clients 810-1 through 810-N (hereinafter referred to collectively to as clients 810 or individually as a client 810) and a network attached storage device 820 connected to a local area network (LAN) 830, which may be either a wireless or wired network. The network attached storage device 820 is connected to a cloud storage service (CSS) 840 through the network 850. The CSS 840 includes a plurality of cloud connectors 841 that facilitate connections between the network attached storage devices 820 and storage devices 842. The storage devices 842 may be or may include, but are not limited to, disk drives and/or SAN/NAS devices, local object storage systems such as EMC® Atmos or OpenStack, and connections to public cloud storage providers 843 (e.g., Amazon Web Services, IBM SmartCloud®, and so on).

The network attached storage device 820 is a cloud-enabled storage device that is integrated with cloud storage services. An example of such a device is disclosed in the U.S. Pat. No. 8,924,511, which is assigned to common assignee, and is hereby incorporated by reference for all that it contains.

The client devices 810 can remotely access files stored in the CSS 840 or in a cloud-enabled storage device 820, for example using the method described in U.S. Pat. No. 8,886,714, assigned to the common assignee, which is hereby incorporated by reference for all that it contains. A folder in the cloud storage can be accessed by many different users of clients. Typically, the owner or a user having the right permissions can invite users to view, modify, add, and/or remove files from the folder. The invitations are generated, sent, and verified as discussed in greater detail herein above. It should be noted that the disclosed embodiments provide a protection layer preventing unauthorized users from accessing content stored in the CSS 840, and/or in the network attached storage device 820.

As a non-limiting example, an invitation may be sent to a user of a client 810-1 and forwarded by that user to a client 810-2. When a user of the client 810-2 tries to access the folder designated in the invitation, a verification code message would be sent to the intended recipient, 810-1. Therefore, client 810-2 would not be able to supply the number designated in any subsequent verification challenges meant for the user of client 810-1 and, therefore, the user of client 810-2 would not be able to access the resource.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing invitation links to access a protected resource, comprising:

creating a plurality of invitation links for accessing the protected resource, each of the invitation links of the plurality includes a secret invitation code encoded therein, the secret invitation code of each of the invitation links of the plurality being different from the secret invitation code any of the other invitation links of the plurality;

sending, to at least one invitee, at least one of the invitation links for accessing the protected resource, wherein the secret invitation code is unique to each invitee, the invitation link is sent to the at least one invitee through a primary communication channel;

upon detecting an attempt to access the protected resource via at least one of the plurality of invitation links, determining whether the encoded secret invitation code matches a known secret invitation code;

upon determining that the secret invitation code matches the known secret invitation code, performing a verification process to authenticate the invitee via a secondary channel of communication, the verification process including transmitting via the secondary channel of communication a verification challenge including information upon which the verification process is based; and upon determining that the verification process has been passed, granting access to the protected resource;

wherein the protected resource is stored in a cloud storage system and is one of at least a file and a folder.

2. The method of claim 1, wherein the verification process further comprises:

generating the verification challenge; and upon receiving a valid response to the verification challenge, determining that the verification process has been passed.

3. The method of claim 2, wherein the verification challenge includes any one of: a random number, a temporary link, a voice prompt, and a token.

4. The method of claim 1, wherein granting access to the protected resource further comprises:

sending a persistent cookie to the invitee device.

5. The method of claim 4, wherein upon subsequent access attempts to the invitation link further comprises:

determining if a valid persistent security cookie has been received; and upon determining that the valid persistent security cookie has been received, bypassing the verification challenge, identifying the invitee device as trusted, and granting access to the protected resource.

6. The method of claim 5, further comprising:

identifying the invitee device as untrusted after a predefined period of time.

7. The method of claim 1, further comprising:

decrementing a maximum usage counter for each access granted to the protected resource, wherein the maximum usage counter was set with an initial value greater than one;

upon detecting an attempt to access the protected resource, determining whether the maximum usage counter is greater than zero; and upon determining that the maximum usage counter is not greater than zero, revoking the invitation link.

8. The method of claim 2, further comprising:

determining if the invitee device meets at least one pre-admission security check requirement; and upon determining that the invitee device does not meet the at least one pre-admission security check requirement, determining that the verification challenge has not been passed.

9. The method of claim 1, wherein the at least one invitation link is generated and sent based on a collaboration policy.

10. The method of claim 8, wherein the at least one invitation link is generated and sent upon compliance with a collaboration policy.

11. The method of claim 10, wherein the collaboration policy defines a set of invitation permissions for external users outside of a predefined group of users, wherein the set of invitation permissions include at least one of: a permission level, a required verification, and at least one challenge restrictions.

12. A non-transitory computer readable medium having stored thereon instructions for causing one or more processing units to execute a method of:

providing invitation links to access a protected resource, comprising:

creating a plurality of invitation links for accessing the protected resource, each of the invitation links of the plurality includes a secret invitation code encoded therein, the secret invitation code of each of the invitation links of the plurality being different from the secret invitation code any of the other invitation links of the plurality;

sending, to at least one invitee, at least one of the invitation links for accessing the protected resource, wherein the secret invitation code is unique to each invitee, the invitation link is sent to the at least one invitee through a primary communication channel;

upon detecting an attempt to access the protected resource via at least one of the plurality of invitation links, determining whether the encoded secret invitation code matches a known secret invitation code;

upon determining that the secret invitation code matches the known secret invitation code, performing a verification process to authenticate the invitee via a secondary channel of communication, the verification process including transmitting via the secondary channel of communication a verification challenge including information upon which the verification process is based; and upon determining that the verification process has been passed, granting access to the protected resource;

wherein the protected resource is stored in a cloud storage system and is one of at least a file and a folder.

13. A system for providing invitation links to access a protected resource with enhanced protection, comprising:

a processing unit; and a memory, the memory containing instructions that, when executed by the processing unit, configure the system to:

create a plurality of invitation links for accessing the protected resource, each of the invitation links of the plurality includes a secret invitation code encoded therein, the secret invitation code of each of the invitation links of the plurality being diffe rent from the secret invitation code any of the other invitation links of the plurality;

send, to at least one invitee, at least one of the invitation links for accessing the protected resource, wherein the secret invitation code is unique to each invitee, the invitation link is sent to the at least one invitee through a primary communication channel;

upon detecting an attempt to access the protected resource via at least one of the plurality of invitation links, determine whether the encoded secret invitation code matches a known secret invitation code;

upon determining that the secret invitation code matches the known secret invitation code, perform a verification process to authenticate the invitee via a secondary channel of communication, the verification process including transmission via the secondary channel of communication a verification challenge including information upon which the verification process is based; and upon determining that the verification process has been passed, grant access to the protected resource;

wherein the protected resource is stored in a cloud storage system and is one of at least a file and a folder.

14. The system of claim 13, wherein when performing the verification process the system is further configured to:

generate the verification challenge;

and upon receiving a valid response to the verification challenge, determine that the verification process has been passed.

15. The system of claim 14, wherein upon subsequent access attempts to the invitation link, the system is further configured to:

determine if a valid persistent security cookie has been received; and upon determining that the valid persistent security cookie has been received, bypass the verification challenge, identify the invitee device as trusted, and grant access to the protected resource.

16. A method for a secured registration process, comprising:

creating a plurality of invitation links for accessing the secured registration process, each of the invitation links of the plurality includes a secret invitation code encoded therein, the secret invitation code of each of the invitation links of the plurality being different from the secret invitation code any of the other invitation links of the plurality;

sending, to at least one invitee, at least one invitation link for registering for a service, wherein the secret invitation code is unique to each invitee, the at least one invitation link is sent to the at least one invitee through a primary communication channel;

upon detecting an attempt to access the secured registration process via at least one of the plurality of invitation links, determining whether the encoded secret invitation code matches a known secret invitation code;

upon determining that the known secret invitation code matches a known secret invitation code, displaying a registration process; and performing a verification process to authenticate the invitee via a secondary channel of communication, the verification process including transmitting via the secondary channel of communication a message including a verification challenge containing information upon which the verification process is based.

17. The method of claim 16, wherein the verification process further comprises:

generating the verification challenge; and upon receiving a valid response to the verification challenge, determining that the verification process has been passed.

18. The method of claim 17, wherein the service is at least a cloud storage service.

19. A system for a secured registration process, comprising:

a processing unit; and a memory, the memory containing instructions that, when executed by the processing unit, configure the system to:

create a plurality of invitation links for accessing the secured registration process, each of the invitation links of the plurality includes a secret invitation code encoded therein, the secret invitation code of each of the invitation links of the plurality being different from the secret invitation code any of the other invitation links of the plurality;

send, to at least one invitee, at least one invitation link for registering fora service, wherein the at least one invitation link includes a secret invitation code encoded therein, wherein the secret invitation code is unique to each invitee, the at least one invitation link is sent to the at least one invitee through a primary communication channel;

upon detecting an attempt to access the secured registration process via at least one of the plurality of invitation links, determine whether the encoded secret invitation code matches a known secret invitation code;

upon determining that the known secret invitation code matches a known secret invitation code, display a registration process; and perform a verification process to authenticate the invitee via a secondary channel of communication, the verification process including transmission via the secondary channel of communication a message including a verification challenge containing information upon which the verification process is based.

20. The system of claim 19, wherein when performing the verification process the system is further configured to:

generate the verification challenge; and upon receiving a valid response to the verification challenge, determine that the verification process has been passed.

21. The method of claim 1, wherein the at least one invitation link is created and sent upon compliance with a collaboration policy, the collaboration policy being implemented using a list, the list being one of a whitelist and a blacklist, the list defining users external to a predefined group of users that can access the resources and at least one of (i) the permissions and (ii) the verification method required, for each of the external users or a group thereof.

22. The method of claim 21, wherein the collaboration policy defines a set of invitation permissions for each of the external users outside of the predefined group of users, wherein the set of invitation permissions include at least one of: a permission level, a required verification, and at least one challenge restrictions.

23. The method of claim 17, wherein the at least one invitation link is created and sent upon compliance with a collaboration policy, the collaboration policy being implemented using a list, the list being one of a whitelist and a blacklist, the list defining users external to a predefined group of users that can access the resources and at least one of (i) the permissions and (ii) the verification method required, for each of the external users or a group thereof.

24. The method of claim 23, wherein the collaboration policy defines a set of invitation permissions for each of the external users outside of the predefined group of users, wherein the set of invitation permissions include at least one of: a permission level, a required verification, and at least one challenge restrictions.

* * * * *